United States Patent
Maiden

(10) Patent No.: US 6,579,495 B1
(45) Date of Patent: *Jun. 17, 2003

(54) HAND-HELD ULTRAVIOLET WATER PURIFICATION SYSTEM USING SOLID STATE DEVICES

(75) Inventor: Miles Maiden, Blue Hill, ME (US)

(73) Assignee: Hydro Photon, Inc., Blue Hill, ME (US)

( * ) Notice: Subject to any disclaimer, the term of this patent is extended or adjusted under 35 U.S.C. 154(b) by 241 days.

This patent is subject to a terminal disclaimer.

(21) Appl. No.: 09/626,603

(22) Filed: Jul. 27, 2000

(51) Int. Cl.$^7$ ................................................ C02F 1/32
(52) U.S. Cl. ................... 422/24; 422/905; 210/748; 250/432 R; 250/504 H; 250/553
(58) Field of Search .................. 422/23, 24, 905; 210/748; 250/432 R, 433, 552, 553, 504 H; 313/498, 500; 257/99

(56) References Cited

U.S. PATENT DOCUMENTS

| | | |
|---|---|---|
| 2,470,806 A | 5/1949 | Del Cueto |
| 3,500,041 A | 3/1970 | Kassing |
| 3,843,521 A | 10/1974 | Zeff |
| 3,906,236 A | 9/1975 | Callahan |
| 3,970,856 A | 7/1976 | Mahaffey et al. |
| 4,274,970 A | 6/1981 | Beitzel |
| 4,276,256 A | 6/1981 | Karamian |
| 4,390,432 A | 6/1983 | Takeguchi et al. |
| 4,416,854 A | 11/1983 | Neilsen |
| 4,752,401 A | 6/1988 | Bodenstein |
| 4,762,613 A | 8/1988 | Snowball |
| 4,790,946 A | 12/1988 | Jansen |
| 4,849,100 A | 7/1989 | Papandrea |
| 4,902,411 A | 2/1990 | Lin |
| 4,971,687 A | 11/1990 | Anderson |
| 4,981,651 A | 1/1991 | Horng |
| 4,992,169 A | 2/1991 | Izumiya |
| 5,106,495 A | 4/1992 | Hughes |
| 5,173,269 A | 12/1992 | Mon et al. |
| 5,266,215 A | 11/1993 | Engelhard |
| 5,393,419 A | 2/1995 | Tiede et al. |
| 5,484,538 A | 1/1996 | Woodward |
| 5,628,895 A | 5/1997 | Zucholl |
| 5,900,212 A | 5/1999 | Maiden et al. |
| 5,919,422 A * | 7/1999 | Yamanaka et al. ......... 422/121 |
| 6,110,424 A | 8/2000 | Madent et al. |

FOREIGN PATENT DOCUMENTS

| | | |
|---|---|---|
| JP | 02006892 | 1/1990 |
| JP | 08117742 | 5/1996 |
| JP | 11155932 A * | 6/1999 |

* cited by examiner

Primary Examiner—Elizabeth McKane
(74) Attorney, Agent, or Firm—Cesari and McKenna, LLP

(57) ABSTRACT

A hand-held water purification system includes an outwardly-extending pen-light sized configuration of solid state devices, such as, UV-light emitting diodes, that emit ultraviolet light in the germicidal range. The system operates to turn on the solid state devices under the control of one or more switches that are, in turn, under the control of a liquid-level sensor that senses when the configuration is immersed in the water. The system may also include a timing circuit that turns the solid state devices off a predetermined time after they are turned on. In one embodiment, a battery powers the various components of the system. In an alternative embodiment, the system power is provided by a base that plugs into a conventional power outlet. The base includes a converter that converts the signal provided through the power outlet to a signal that is appropriate to power the components.

22 Claims, 5 Drawing Sheets

HAND-HELD ULTRAVIOLET WATER PURIFICATION SYSTEM USING SOLID STATE DEVICES

This application is related to application Ser. No. 09/256,054, filed Feb. 23, 1999, now U.S. Pat. No. 6,110,424, which is a continuation of patent application Ser. No. 08/790,750, filed Jan. 27, 1997, that issued as U.S. Pat. No. 5,900,212.

BACKGROUND OF THE INVENTION

1. Field of the Invention

The invention relates to systems for disinfecting water using ultraviolet light.

2. Background of the Invention

It is known that ultraviolet ("U5V") light in the germicidal range, of approximately 254 nm, can be used to disinfect water, that is, to rid water of bacteria, viruses, algae and so forth. Known prior water purification systems that use UV light are large, installed systems that each include a flow-through subsystem, which causes water to travel past an elongated UV light source that is suspended therein. A quartz sleeve surrounds the UV light source, to protect it and its electrical connections from the water while allowing the UV radiation to pass to the water. Such systems are currently used to purify water for use in, for example, hospitals or schools.

The flow-through subsystems each essentially include a flow-through chamber, i.e., a pipe. As water flows through the pipe, it travels past the quartz sleeve, and thus, the UV light source, and is exposed to UV radiation. The UV radiation kills the bacteria, viruses and so forth that are present in the water. Waste byproducts may build up on the quartz sleeve, and accordingly, the systems include wiper mechanisms that periodically clean the quartz sleeves. These systems typically include a mechanism, such as a viewing port and/or a sensor, for determining the output level of the lamp. A user can visually check the lamp through the view port to ensure both that the lamp is turned on and that the quartz sleeve is sufficiently clean to pass the level of UV radiation required to disinfect the water. The sensor measures the UV radiation for the same purpose. These flow-through systems work well for disinfecting relatively large quantities of water. They are not, however, suitable for disinfecting small quantities of water.

Today campers, hikers, travelers and the like encounter bacteria and virus infected water in streams, lakes and rivers, and in some countries even in the local plumbing. These hikers, campers and travelers must thus either carry bottled water with them or use portable filtering systems and/or chlorine, hydrogen peroxide or iodine tablets, to disinfect the water. The filtering systems are generally bulky, and thus, inconvenient to carry. Further, while they may remove bacteria and algae from the water, they do not remove viruses, which are typically too small to be caught in the filters. The chemical tablets are certainly portable but they are relatively expensive. Further, the tablets change the taste and smell of the water and add undesirable chemical byproducts to the water. Indeed, the tablet manufacturers generally warn against continuous use of the tablets, for health reasons.

SUMMARY OF THE INVENTION

The invention is a portable, hand-held water purifier that uses a configuration of solid state devices that produce UV light, such as UV-light emitting diodes ("UV-LEDs"), to disinfect small quantities, or batches, of water. The water purifier, which is approximately the size and shape of a pen light, has the configuration of UV-LEDs extending outwardly from one end. The UV-LEDs are dipped into a container of water and turned on, to rid the water of infectious agents. As necessary, the user may use the LED end of the system to agitate the water, to ensure that all of the water passes sufficiently close to the UV-LEDs.

The system, which may be battery-operated, further includes a liquid-level sensor at the base of the configuration of UV-LEDs. The sensor prevents the UV-LEDs from turning on until they are fully immersed in the water. The container and the water act to shield the UV radiation, such that very little is emitted from the container. This prevents potentially harmful UV radiation from reaching the user and, in particular, the user's eyes.

The system may also include a timing circuit that keeps the UV-LEDs lit for an appropriate time to ensure that the water is purified.

The system may further include a base that houses an alternative power source for the purifier, with the purifier connected to the base by a cord. The base may hold also the purifier at an angle that is appropriate for submersion of the UV-LEDs in the batch of water to be purified.

BRIEF DESCRIPTION OF THE DRAWINGS

The above and further advantages of the invention may be better understood by referring to the following description in conjunction with the accompanying drawings, in which.

DETAILED DESCRIPTION OF AN ILLUSTRATIVE EMBODIMENT

Figure 1:
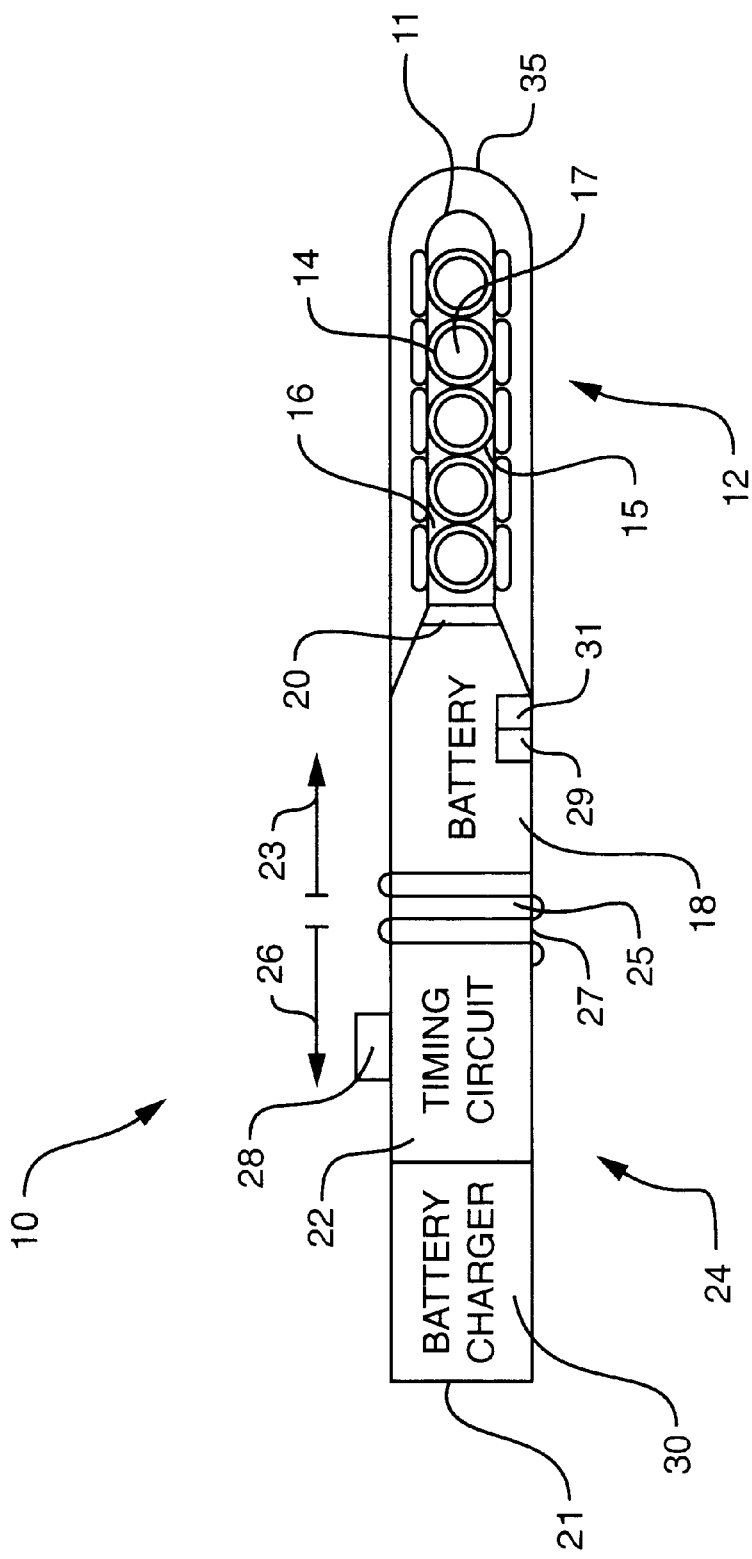
FIG. 1 is a cut away side view of a portable water purification system constructed in accordance with the invention.

FIG. 1 illustrates a portable, hand-held water purification system 10 for disinfecting water in relatively small batches. The system includes, extending from a first end 11, a pen-light sized configuration 12 of one or more UV-LEDs 14 that emit ultraviolet light in the germicidal range. The UV-LEDs are powered in a conventional manner by a battery 18. As discussed in more detail below with reference to FIG. 2, the first end of the system is immersed in water and the UV-LEDs are turned on to purify the water.

Each UV-LED 14 is encased in a sealed package 15 that includes as a cover an ultraviolet transmissive lens 17. Leads (not shown) through which battery power is provided to the encased UV-LED extend from a bottom end of the package. The sealed UV-LED packages are, in turn, arranged in a housing 16 that is part of a water-tight case 24. The housing 16 provides water-tight seals around the respective UV-LED packages, to prevent water from reaching the leads and the associated circuitry that connects the leads to the battery. When the device is not in use, a removable cover 35 may be used to protect the end 11 of the device.

Alternatively, the configuration 12 of UV-LEDs 14 may be encased as a group in an ultraviolet transmissive cover (not shown) that connects in a water-tight manner to a top end 23 of the water-resistant case 24.

A liquid-level sensor 20, which is connected to switches (not shown) between the UV-LEDs 14 and the battery 18, prevents the UV-LEDs from turning on until the configuration 12 is fully immersed in water. The UV radiation from the UV-LEDs is then absorbed and/or reflected by the water and the container such that very little of the UV radiation escapes from the container. The user, who is holding the end 21 of the system, is thus protected from harmful levels of the UV radiation, which might otherwise adversely affect his or her eyes.

The sensor 20 may, for example, be a capacitive-type sensor that senses the difference in capacitance of the water and the surrounding air. When the sensor determines that it is in water, which necessarily means that the configuration 12 of UV-LEDs 14 is immersed in the water, the sensor closes the switches and allows the UV-LEDs to turn on.

The water purifier 10 may also include a timing circuit 22 connected between the sensor 20 and the UV-LEDs 14. The timing circuit turns the UV-LEDs off a predetermined time, for example, 15 seconds, after the sensor 20 turns the UV-LEDs on.

The battery 18 and related circuitry are also encased in the water-resistant case 24. The entire water purifier is approximately six and three-quarters inches long and five-eighths of an inch in diameter, and fits comfortably in one hand. The case 24 includes two parts, namely, s top 23 and a bottom 26, that screw together at a joint 25, so that the battery 18 can be replaced, as necessary. A silicon O-ring 26 makes the joint 25 water-tight.

The user controls the system with an on-off switch 28. As discussed above, the lighting of the UV-LEDs 14 may ultimately be controlled by the liquid-level sensor 20, such that the UV-LEDs light only when both the on-off switch 28 is in the on position and the configuration 12 of UV-LEDs is fully immersed in water.

The water purifier 10 may also include a battery charger 30, which in the exemplary system is a conventional inductive-type charging circuit. Further, the purifier may include a power-on LED 29 and a low-battery LED 31, which indicate to a user, respectively, that the UV-emitting UV-LEDs 14 are lit and that the battery needs replacing or recharging.

The configuration 12 depicted in FIG. 1 includes a plurality of UV-LEDs 14 arranged on all sides of the housing 16. The configuration may instead include more or fewer UV-LEDs 14, as long there is a number of UV-LEDs that is sufficient to produce UV radiation of at least 10 mJ per square cm. In the exemplary system the UV-LEDs are selected to produce UV radiation of approximately 15 mJ per square cm.

Figure 2:
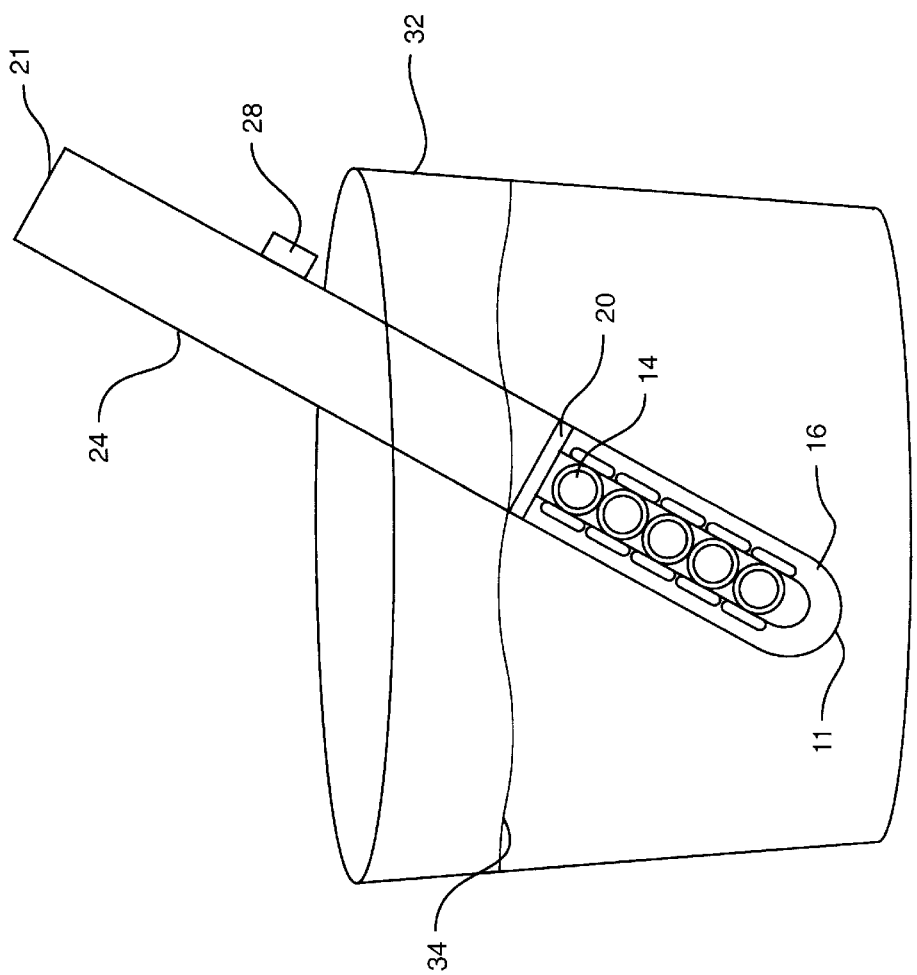
FIG. 2 illustrates the portable water purification system of FIG. 1 in use.

Referring now to FIG. 2, a user places the end 11 of the water purifier 10 in water 34 that is, in the example, contained in a drinking glass 32. The user turns the system 10 on by moving the on-off switch 28 to the appropriate position. When the liquid-level sensor 20 determines that the configuration 12 of UV-LEDs 14 is fully immersed in the water, the sensor closes the switches (not shown) that separate the battery 18 (FIG. 1) from the UV-LEDs, and the UV-LEDs then turn on. As appropriate the sensor 20 also starts the timing circuit 22 that keeps the UV-LEDs lit for a predetermined time.

The user may use the end 11 of the system 10 to stir the water 34, to ensure that all of the water comes sufficiently close to the source of the UV radiation. If the container is small, however, the user need not stir the water.

After use, the user may wipe or wash the UV-LED lenses 17 or, as appropriate, the ultraviolet transmissive cover, to clear away any waste byproducts that may have adhered thereto and may adversely affect the output level of the device. Accordingly, the hand held purifier needs not include a complex wiping mechanism and associated radiation-level sensor, as is required in the prior flow-through systems.

The UV-LEDs 14 use relatively little energy. Accordingly, the configuration of UV-LEDs does not deplete the battery 18 as rapidly as, for example, a UV lamp that produces the same level of UV radiation. Further, the UV-LEDs do not have the same ramp-up time as the UV lamp, and thus, the UV-LEDs may purify the water in less time than the UV lamp. The configuration of UV-LEDs is, however, more expensive than the conventional UV lamp.

Figure 3:
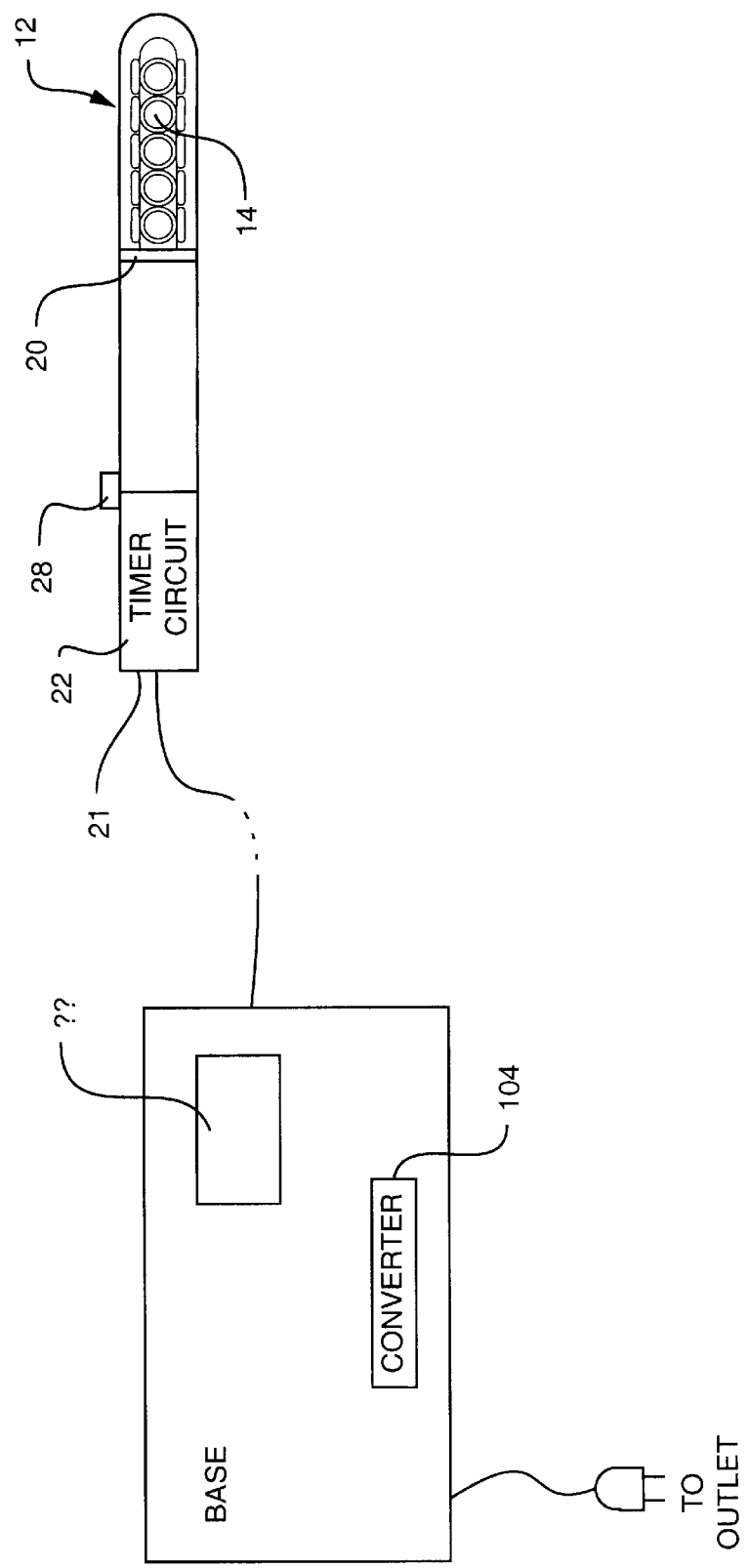
FIG. 3 depicts the system of FIG. 1 with an additional base that houses an alternative power source.

Referring now to FIG. 3, an alternative UV-LED water purification system 100 that includes the configuration 12 of one or more UV-LEDs 14 is powered through a base 102 that plugs into a conventional power outlet (not shown). The base includes a converter 104 that operates in a known manner to convert the signal provided by the power outlet to a signal that is appropriate to power the UV-LEDs and the other electronic components, namely, the level sensor 20 and the timing circuit 22. The purifier connects to the base through a power cord 108. When not in use, the purifier may be stored in a holder 106.

Figure 4:
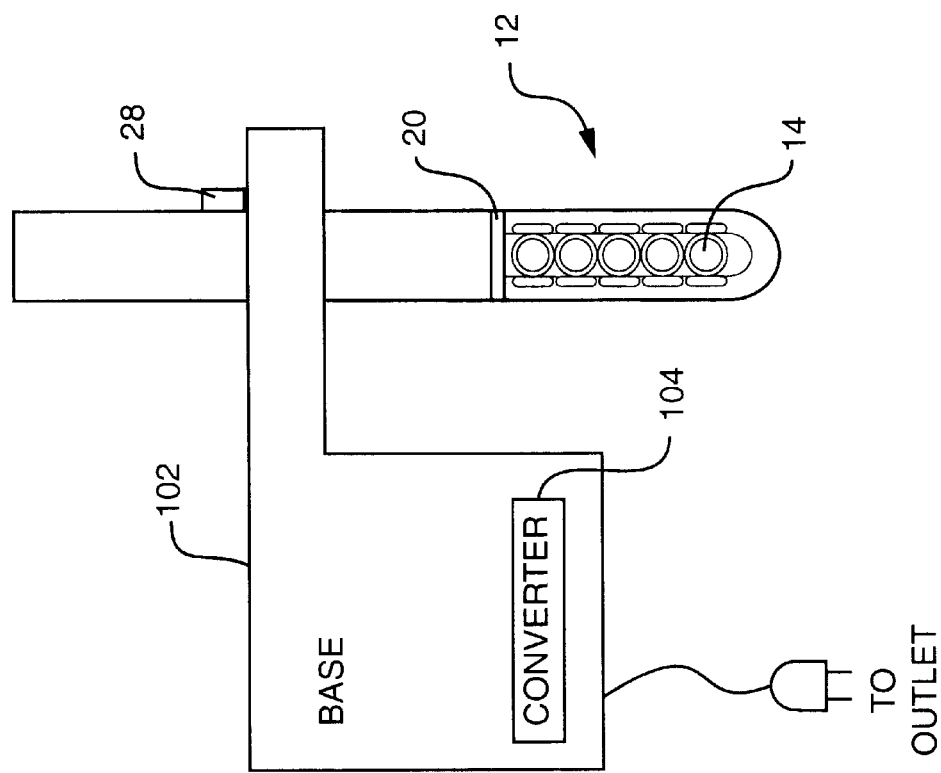
FIG. 4 depicts the system of FIG. 3 with an alternative base.

As depicted in FIG. 4, the base 102 may also support the water purifier while the purifier is in use. Accordingly, the base is designed to hold the configuration of UV-LEDs at an angle that is appropriate for submersion in a batch of water.

Figure 5:
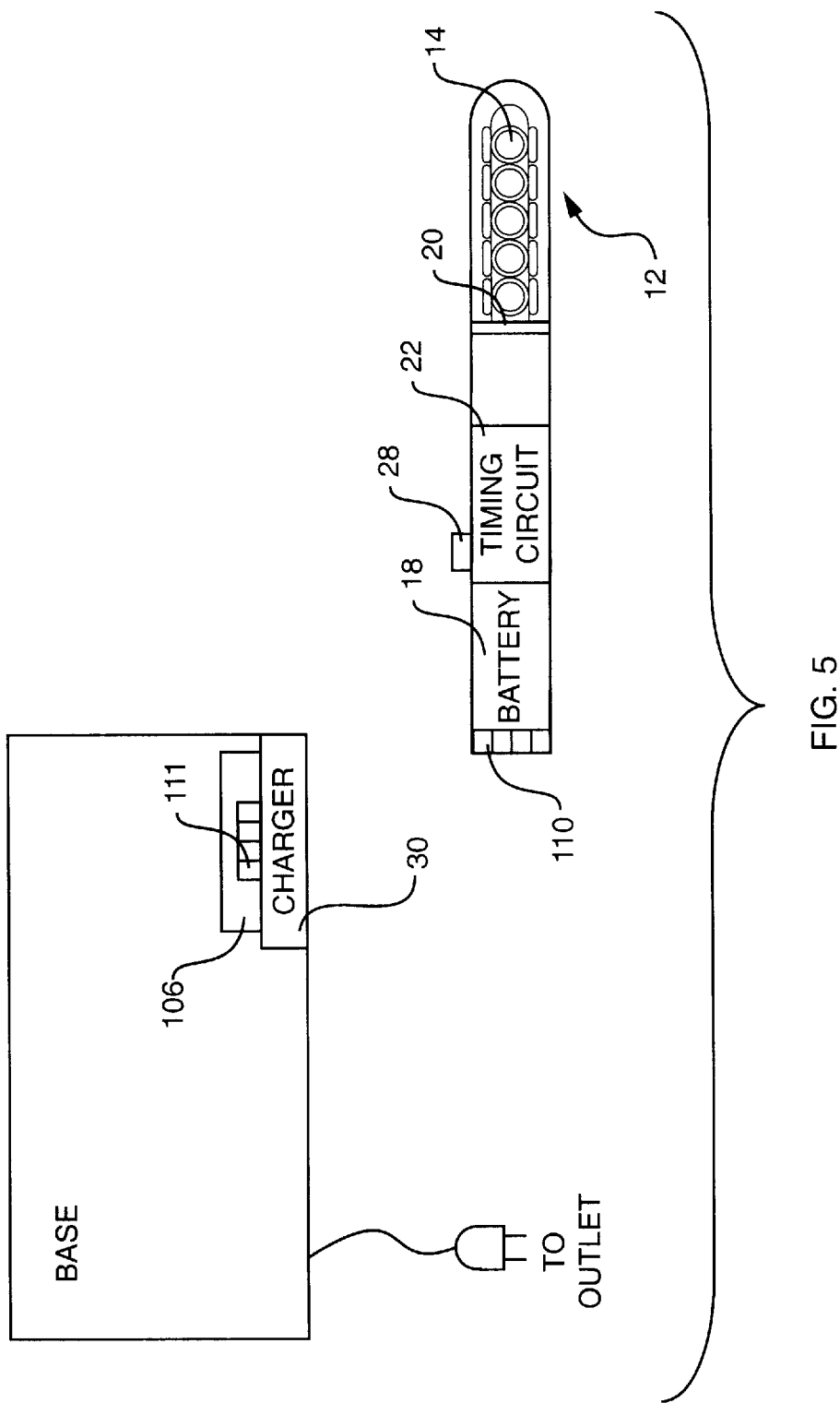
FIG. 5 illustrates a portable water purification system with a battery and base battery charger.

As shown in FIG. 5, the base may instead include the battery charger 30. The end 21 of the case includes the appropriate connectors 110 for connecting the battery 18 to the charger. The battery 18 is then re-charged when the case is held in the holder 106, which houses a mating connector 111. When the purifier is removed from the holder 106, the purifier is used in the same manner as discussed above with reference to FIG. 2.

In brief summary, the hand-held UV water purification system 10 is a fully portable system that disinfects relatively small quantities, or batches, of water, such as the water contained in a drinking glass. The water purifier 10 is small and light weight so that it is easily and conveniently used when traveling, hiking, camping and so forth. The system includes UV light control mechanisms that prevent inadvertent UV light exposure.

This is in contrast to known flow-through UV water purification systems that are designed to disinfect large quantities of water for schools, hospitals and so forth. Such flow-through systems are installed such that water is piped past an elongated UV light source that is permanently suspended in the piping. When the water is released into the pipe, the UV light source is operating at its steady state and the water is allowed to flow past the UV light source at a controlled rate. These flow-through systems do not work well with the small quantities of water with which the hand-held portable system is expected to be used, are not conveniently portable, and are not designed to conserve power.

The foregoing description has been limited to specific embodiments of this invention. It will be apparent, however, that variations and modifications may be made to the invention, such as the use of configurations of UV-LEDs or other solid state UV light producing devices of various sizes and shapes, the use of alternative power sources such as a transformer that operates to transform electrical current supplied through a wall outlet to an appropriate voltage for the solid state devices, and so forth, with the attainment of some or all of the advantages. Therefore, it is the object of the appended claims to cover all such variations and modifications as come within the true spirit and scope of the invention.

What is claimed is:

1. A hand-held water purification system including:
   A. a case that supports the system, the case having a first end and a second end and being sized to be held in one hand;
   B. one or more UV-light emitting diodes that are arranged to emit UV light in a germicidal range outwardly from the first end of the case; and
   C. a battery that fits into the case and powers the one or more UV-light emitting diodes,
   wherein the first end of the case is submerged in the water and the one or more UV-light emitting diodes turned on to purify the water.

2. The system of claim 1 further including a liquid-level sensor that prevents the one or more UV-light emitting diodes from turning on until the one or more UV-light emitting diodes are immersed in water.

3. The system of claim 2 further including a timing circuit that turns the one or more UV-light emitting diodes off a predetermined time after the one or more UV-light emitting diodes turn on.

4. A method of purifying a batch of water that is held in a container, the method including the steps of:
   A. immersing in the batch of water to be purified a configuration of one or more light emitting diodes that emit UV light in a germicidal range; and
   B. turning the configuration on to emit ultraviolet radiation in the container to purify the water.

5. The method of claim 4 further including the step of agitating the water.

6. The method of claim 5 further including the step of turning the configuration off a predetermined time after the configuration is turned on.

7. The method of claim 6 wherein the step of turning the configuration on further includes sensing that the configuration is immersed in water before turning the configuration on.

8. A hand-held system for purifying unsterilized water, the system including:
   D. a case with a configuration of one or more solid state devices that emit UV light in a germicidal range outwardly from the case, the configuration for submerging in the unsterilized water and providing ultraviolet emissions that purify the unsterilized water;
   E. power means for powering the configuration; and
   F. control means for turning the configuration on and off, the control means being contained in the case.

9. The system of claim 8 wherein the control means includes
   a. a switch; and
   b. a timer for operating the switch to turn the configuration off a predetermined time after the configuration turns on.

10. The system of claim 9 wherein the control means further includes a liquid-level sensor for preventing the configuration from turning on until the configuration is immersed in the water.

11. The system of claim 9 wherein the one or more solid state devices are one or more UV-light emitting diodes.

12. The system of claim 8 wherein the power means is a battery.

13. A method of purifying a batch of unsterilized water that is held in a container, the method including the steps of:
   A. immersing a configuration of one or more solid state devices that emit ultraviolet light in a germicidal range and form one end of a water purification system in the batch of unsterilized water that is held in the container;
   E. turning the configuration on to emit ultraviolet radiation in the batch of unsterilized water in order to sterilize the water;
   F. turning the configuration off; and
   G. removing the configuration from the batch of water held in the container.

14. The method of claim 13 wherein the step of turning the configuration off further includes turning the configuration off a predetermined time after turning the configuration on.

15. The method of claim 14 wherein the one or more solid state devices are one or more UV-light emitting diodes.

16. A portable water purification system including:
   C. a configuration of one or more solid state devices that emit UV light in a germicidal range, the configuration arranged to emit UV light outwardly;
   D. a case that supports the configuration of solid state devices; and
   C. a power source that supplies power to the solid state devices,
   wherein the configuration of solid state devices is submerged in a batch of water and the power source supplies power to turn on the one or more devices in order to purify the water.

17. The system of claim 16 wherein the power source includes
   a. a base that plug into a power outlet, and
   b. a converter that converts the signal provided by the power outlet to a signal that is appropriate to power the solid state devices.

18. The system of claim 17 wherein the solid state devices are UV-lighe emitting diodes.

19. The system of claim 18 further including a liquid-level sensor that prevents the one or more solid state devices from turning on until the one or more devices are immersed in water.

20. The system of claim 19 further including a timing circuit that turns the one or more solid state devices off predetermined time after the one or more devices turn on.

21. The system of claim 17 wherein the base further includes a stand for holding the case in a position in which the configuration of solid state devices is angled for submersion in a batch of water to be purified.

22. The system of claim 16 wherein the power source includes
   a. a battery housed in the case, and
   b. a base that housed a battery charger.

* * * * *

UNITED STATES PATENT AND TRADEMARK OFFICE
CERTIFICATE OF CORRECTION

PATENT NO. : 6,579,495 B1
DATED : June 17, 2003
INVENTOR(S) : Miles Maiden

It is certified that error appears in the above-identified patent and that said Letters Patent is hereby corrected as shown below:

<u>Title page,</u>
Item [*] Notice, the statement regarding a terminal disclaimer should be replaced with the following:

-- The patent is not subject to a terminal disclaimer. --

Signed and Sealed this

Seventh Day of October, 2003

JAMES E. ROGAN
*Director of the United States Patent and Trademark Office*